US009582941B2

(12) United States Patent
Reymann et al.

(10) Patent No.: US 9,582,941 B2
(45) Date of Patent: Feb. 28, 2017

(54) ADAPTIVE GATE WALKWAY FLOOR DISPLAY

(71) Applicant: Cubic Corporation, San Diego, CA (US)

(72) Inventors: Steffen Reymann, Reigate (GB); Jon Packham, Ashford (GB); Dave Roat, Horsham (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/700,425

(22) Filed: Apr. 30, 2015

(65) Prior Publication Data

US 2015/0317853 A1 Nov. 5, 2015

Related U.S. Application Data

(60) Provisional application No. 61/986,710, filed on Apr. 30, 2014.

(51) Int. Cl.
*B60R 25/00* (2013.01)
*G07B 15/00* (2011.01)
*G07C 9/00* (2006.01)

(52) U.S. Cl.
CPC ......... *G07B 15/00* (2013.01); *G07C 9/00007* (2013.01); *G07C 9/00103* (2013.01); *G07C 9/00111* (2013.01)

(58) Field of Classification Search
CPC .................. G07C 2009/00793; G07C 9/00182
USPC ........................................................... 340/5.7
See application file for complete search history.

(56) References Cited

U.S. PATENT DOCUMENTS 6,292,100 B1 * 9/2001 Dowling ................ G08B 13/19 340/545.1
7,529,025 B1 * 5/2009 Karterman ......... G02B 27/2214 359/619
8,181,867 B1 5/2012 Bierbaum
8,457,879 B2 * 6/2013 Merkel .................. G01C 21/20 340/541

(Continued)

FOREIGN PATENT DOCUMENTS

GB 2324373 A * 10/1998
WO 2009/009100 1/2009

OTHER PUBLICATIONS

International Search Report and Written Opinion for PCT/US2015/028516, mailed Oct. 7, 2015, 11 pages.

*Primary Examiner* — Hai Phan
*Assistant Examiner* — Royit Yu
(74) *Attorney, Agent, or Firm* — Kilpatrick Townsend and Stockton, LLP

(57) ABSTRACT

Systems and techniques are presented for displaying information customized for a ticket of a fare gate. Ticket information for the ticket is received via a ticket validation device. A customized image for the ticket is determined based on the ticket information. Further, a first position of an object is detected within an area of the floor. Based on the first position of the object, a second position within the area for displaying the customized image is determined. The second position is proximate to the first position. A display image is determined for the area and the display image includes the customized image at the second position. The display image is displayed within the area on the floor.

20 Claims, 6 Drawing Sheets

(56) References Cited

U.S. PATENT DOCUMENTS

| | | | | |
|---|---|---|---|---|
| 8,738,292 | B1 * | 5/2014 | Faaborg | G01C 21/26 701/117 |
| 2004/0051644 | A1 * | 3/2004 | Tamayama | G06F 17/30017 340/686.1 |
| 2005/0086313 | A1 * | 4/2005 | Lucas | A61L 2/10 709/206 |
| 2009/0008439 | A1 | 1/2009 | Kubler | |
| 2009/0224872 | A1 | 9/2009 | Naccache | |
| 2010/0277328 | A1 * | 11/2010 | Mullan et al. | 340/665 |
| 2011/0054780 | A1 * | 3/2011 | Dhanani et al. | 701/204 |
| 2011/0157486 | A1 * | 6/2011 | Murata | G08B 7/062 348/744 |
| 2011/0275432 | A1 * | 11/2011 | Lutnick | G07F 17/3232 463/25 |
| 2012/0109735 | A1 * | 5/2012 | Krawczewicz | G06K 19/0701 705/14.27 |
| 2012/0212647 | A1 * | 8/2012 | Ueno | G03B 17/54 348/231.99 |
| 2012/0253672 | A1 * | 10/2012 | Hoshino | G01C 21/20 701/541 |
| 2012/0275686 | A1 * | 11/2012 | Wilson | G06K 9/00355 382/154 |
| 2013/0070974 | A1 * | 3/2013 | Stefani | G06K 9/00778 382/118 |
| 2013/0097002 | A1 * | 4/2013 | Dishneau | G06Q 30/0255 705/14.25 |
| 2014/0039945 | A1 * | 2/2014 | Coady | G06Q 10/02 705/5 |
| 2014/0113660 | A1 | 4/2014 | Park | |

* cited by examiner

ADAPTIVE GATE WALKWAY FLOOR DISPLAY

CROSS-REFERENCES TO RELATED APPLICATIONS

This application claims the benefit of U.S. Provisional Patent Application No. 61/986,710, filed Apr. 30, 2014, entitled "ADAPTIVE GATE WALKWAY FLOOR DISPLAY," the entire disclosure of which is hereby incorporated by reference for all purposes.

BACKGROUND

1. The Field of the Invention

The present invention generally relates to fare gates. More specifically, the present invention relates to displaying customized information to passengers at fare gates.

2. the Relevant Technology

A turnstile is a commonly found example of a fare gate that can be placed at entry or exit gatelines to process pedestrians through the gate. The turnstile ensures that pedestrians can only pass through the gate in one direction and only one pedestrian can pass through at a time. A payment device can be used in conjunction with a turnstile to automate the fee collection and access granting processes. For example, a payment device that accepts coins, tokens, tickets, or cards can be placed next to the turnstile and can operate the turnstile to grant passage only if a valid payment has been received. Turnstiles also typically include small displays to indicate feedback information, such as a success/failure message or remaining credit.

Turnstiles with payment devices and displays can be used in a wide variety of settings to restrict access to paying customers. While turnstiles are most commonly found in mass transit systems, they can also be utilized at stadiums and sporting events, amusement parks and attractions, or any other setting where payment is collected in exchange for access to a restricted area.

BRIEF SUMMARY

In one embodiment, a system for displaying information customized for a ticket of a fare gate is presented. The system includes a ticket validation device, a display device and a tracking system. The ticket validation device is configured to receive ticket information from the ticket that is presented to the ticket validation device. The display device is configured to display visual information on an area of a floor. The tracking system is configured to detect an object within the area and track a first position of the object within the area. The system further includes a computer server system coupled to the ticket validation device, the display device and the tracking system. The computer server system is configured to receive ticket data from the ticket validation device. The ticket data indicates the ticket information of the ticket. Based on the ticket data, a customized image for the ticket is determined. The computer server system is further configured to receive position data from the tracking system. The position data indicates the first position of the object within the area. Based on the first position of the object, a second position within the area for displaying the customized image is determined, the second position being proximate to the first position. A display image for the area is determined and the display image includes the customized image at the second position. The computer server system is further configured to transmit a signal to the display device that causes the display image to be displayed within the area on the floor.

In another embodiment, a method for displaying information customized for a ticket of a fare gate is presented. The method includes receiving ticket information for the ticket via a ticket validation device. A customized image for the ticket is determined based on the ticket information. The method further includes detecting a first position of an object within an area of a floor. Based on the first position of the object, a second position within the area for displaying the customized image is determined, the second position being proximate to the first position. A display image for the area is determined and the display image includes the customized image at the second position. The display image is displayed within the area on the floor.

In a further embodiment, a non-transitory computer-readable medium is presented. The non-transitory computer-readable medium has instructions stored therein, which when executed cause a computer to perform a set of operations including receiving ticket data from a ticket validation device. The ticket data indicates ticket information for a ticket of a fare gate. A customized image for the ticket is determined based on the ticket data. Further operations include receiving position data from a tracking system. The position data indicates a first position of an object within an area of a floor. Based on the first position of the object, a second position within the area for displaying the customized image is determined. The second position is proximate to the first position. A display image for the area that includes the customized image at the second position is determined and a signal is transmitted to a display device that causes the display device to display the display image within the area on the floor.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
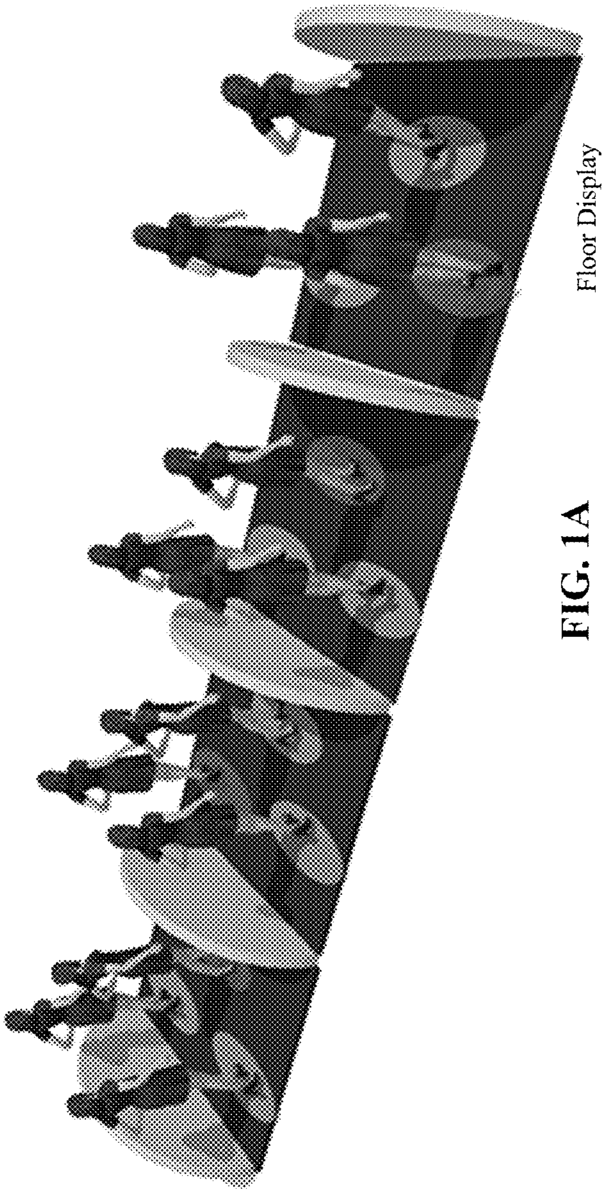
FIG. 1A is an artistic impression of a gateline with a floor display for displaying customized information.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. Further, when a particular feature, structure, or characteristic is described in connection with an embodiment, it is submitted that it is within the knowledge of one skilled in the art to implement such feature, structure, or characteristic in connection with other embodiments whether or not explicitly described.

Fare gates such as turnstiles can be placed at ingress and egress gatelines for controlling access to restricted areas and to process pedestrians through the gatelines in an orderly fashion. A fare gate can include a ticket validation device, such as a traditional card reader or a radio frequency (RF) transceiver device that can communicate wirelessly with a smart card or mobile device, or some other payment device to fully automate the payment collection and access granting process. Additionally, a small display can be placed at the gate to indicate a number of feedback information, such as remaining credit on smartcard based tickets or general success/failure messages. However, the area of display and the amount of time that the display remains visible as passengers go through the gate are limited. As a result, the displays can only be used to communicate simple messages, and passengers must go to designated areas with larger displays to obtain additional information if necessary. This can cause delays and unwanted crowding in stations, which can be especially undesirable for passengers that are running late.

Embodiments described herein are directed toward using the floor walkway of ticketing gates to display information relevant to the passenger passing through it, either projected from overhead or directly from a floor display. Information displayed can include ticket validation confirmation (success or failure), directions to a particular platform (relevant to the ticket presented) or indication of suggested directions. The position and walking direction of the passenger through the gate walkway can be tracked by the system so information is always presented right in front of the passenger. The system can allow for tracking multiple passengers at a time and display different information to each passenger. Although examples and embodiments provided herein are described in the context of public transit systems, it is understood that embodiments are not so limited. Rather, the concepts described herein may be implemented in any environment where a fare gate may be found, such as sports stadiums, music halls, movie theatres and amusement parks.

FIG. 1A is an artistic impression of a gateline with a floor display for displaying customized information. As illustrated in this impression, the floor display is capable of tracking multiple passengers simultaneously and displaying different information to each passenger.

Figure 1B:
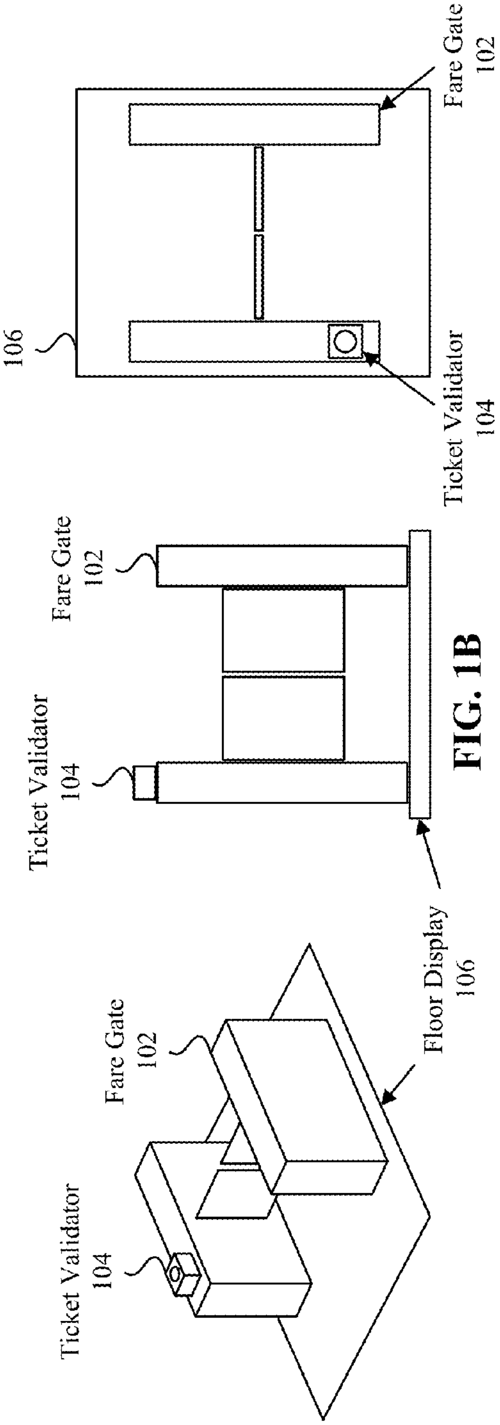
FIG. 1B is an illustration of different views of one embodiment of a fare gate with a ticket validator and a floor display for displaying customized information.

FIG. 1B is an illustration of different views of one embodiment of a fare gate 102 with a ticket validator 104 and a floor display 106 for displaying customized information. Specifically, fare gate 102 with ticket validator 104 and floor display 106 are illustrated in an angled view, a front view and a top view from left to right, respectively. Floor display 106 is either an electronic display itself, or used as a projection area for an overhead projector, and the display can be controlled from a central processing unit (CPU) (not shown in this figure, see FIGS. 2 and 6). The position of the passenger in the gate walkway is determined by either having a pressure sensitive walkway or by use of an overhead camera (not shown in this figure, see FIG. 2). Fare gate 102 can also include detection beams across the walkway which can also be used to determine location of the passenger within.

Figure 2:
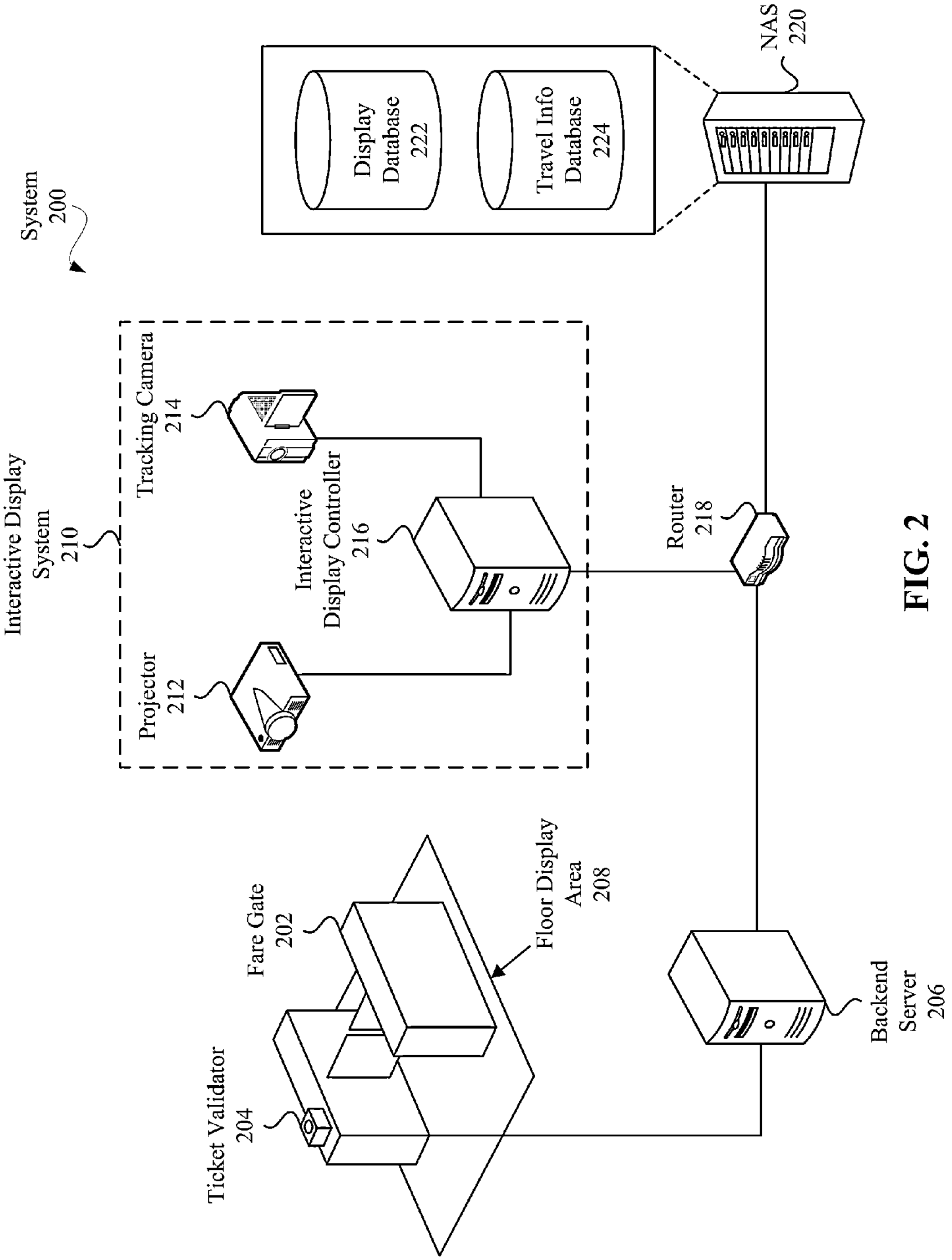
FIG. 2 is an illustration of an example embodiment of a system for displaying information customized for a ticket of a fare gate.

FIG. 2 is an illustration of an example embodiment of a system 200 for displaying information customized for a ticket of a fare gate. In this embodiment, system 200 includes a fare gate 202, which further includes a ticket validator 204. Ticket validator 204 can be any ticket validation device that is capable of receiving ticket information, such as a bar code scanner, traditional card reader that can read information from magnetic stripes, or an RF transceiver that can communicate wirelessly with contactless smart cards or mobile devices. When communicating with mobile devices, ticket validator 204 can use a variety of different wireless protocols, including Bluetooth, Bluetooth low energy (BLE), near field communication (NFC) protocols, or any other wireless standard for communication. Ticket validator 204 is coupled with backend server 206 so that ticket information received by ticket validator 204 can be transmitted to backend server 206 for further processing.

System 200 also includes floor display area 208 and an interactive display system 210, which further includes a projector 212, a tracking camera 214 and an interactive display controller 216. In this embodiment, projector 212 is the display device and customized information is projected onto floor display area 208 by projector 212. In other embodiments, floor display area 208 can be a display device itself, such as a light-emitting diode (LED) display or a liquid-crystal display (LCD), and projector 212 is not needed. In some embodiments, the display device can display differentiated status information to passengers on opposite sides of fare gate 202 in the same area of display. For example, polarization filters, directive lensing, and other autostereoscopy techniques, such as a lenticular lens, can be used so that a first passenger looking at an area of the floor display from one side (e.g., from 0 to 90 degrees) sees a different image than a second passenger that is looking at the area of the display from another side (e.g., from 90 to 180 degrees). Thus, the first passenger might see an image indicating that gate 202 is open, while the second passenger might see an image indicating that gate 202 is closed.

Additionally, in this embodiment, the position of passengers walking on floor display area 208 is tracked by tracking camera 214, which can be a video camera and/or a depth sensing camera that, for example, generates beams of infrared light. After the infrared light reflects off of passengers and other objects within floor display area 208, tracking camera 214 can detect the reflected light and positions can be determined using techniques such as video analysis and/or time-of-flight based on when the infrared light is generated and detected. In other embodiments, different position sensing technologies can be implemented in addition to or instead of using tracking camera 214. For example, floor display area 208 can include a pressure sensitive walkway that can detect the position of passengers on the walkway, and crossbeams of infrared or other forms of light that go across the walkway can also be used to determine location of passengers within the area.

Projector 212 and tracking camera 214 are coupled with interactive display controller 216, which transmits images or videos to projector 212 for display and receives position data from tracking camera 214 for processing. Furthermore, backend server 206 and interactive display system 210, more specifically interactive display controller 216, are coupled with router 218 to establish communication between the two devices 206 and 216. This enables customized information to be displayed based on the ticketing information that is received by ticket validator 204. It is understood that in other embodiments, the components of system 200 can be coupled in different ways while still providing for the same communication capabilities and other features described herein. For example, ticket validator 204, projector 212 and tracking camera 214 can be coupled with router 218 to establish communication with backend server 206 and interactive display controller 216, rather than being coupled directly to the devices 206 and 216. Furthermore, interactive display controller 216 can be implemented as a software module within backend server 206, rather than as a separate computer component.

Router 218 is further coupled with network attached storage (NAS) 220, which can include one or more databases. NAS 220 stores data for system 200 that is used for displaying customized information and performing other functions and features described herein. NAS 220 can be any type of storage device that is accessible over a network, including a storage area network (SAN). In other embodiments, the databases can be stored in backend server 206 rather than on a separate physical machine dedicated to data storage.

In this embodiment, NAS 220 stores a display database 222 and a travel information database 224. Display database 222 can be used to store text, images, videos, sounds and information in other forms of media to be presented to passengers. Example information that can be stored in display database 222 include direction indicators for directions to departure platforms, boarding areas or gates for connection segments of travel; gate status indicators that tell passengers whether the gate is open or closed in a certain direction; ticket status indicators that tell passengers whether the ticket was successfully validated, or discounts/concessions that were applied to the ticket's fare; maps and layouts of stations; and advertisements for local businesses or businesses within the station.

Travel information database 224 can be used to store travel information for different tickets that are issued by system 200. Travel information can include, for example, platform numbers or boarding gate numbers, delays to departure time, estimated travel time, estimated arrival time, local information or destination information such as time zone or weather information, connection information for each segment of a trip, and fare information. In one embodiment, information database 224 can be indexed by ticket identification numbers or identifiers for categories of tickets so that information specific to a ticket that is presented to ticket validator 204 can be retrieved efficiently and with minimal delay.

Figure 3:
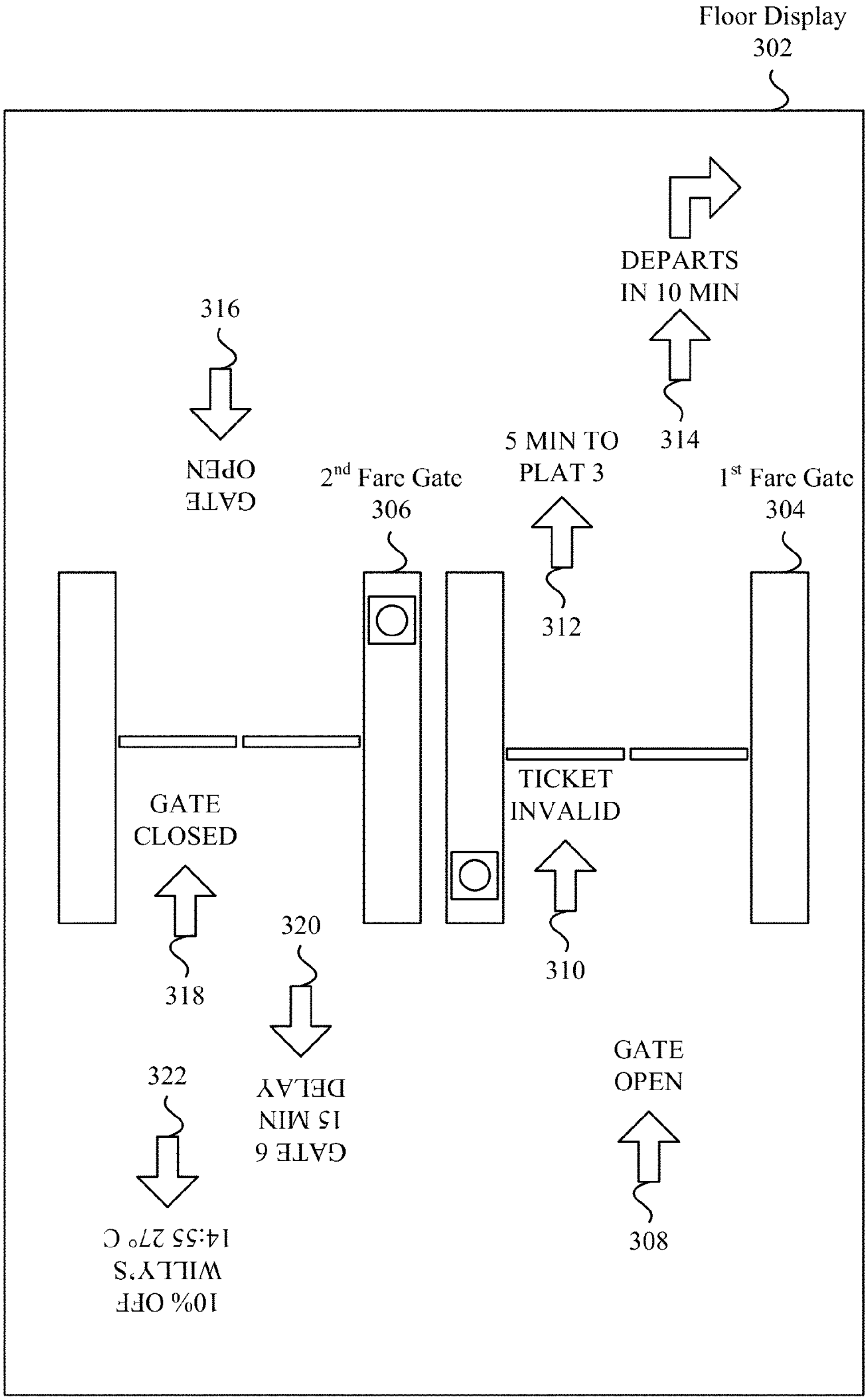
FIG. 3 is an illustration of one embodiment of a floor display that is displaying customized information for different passengers.

FIG. 3 is an illustration of one embodiment of a floor display 302 that is displaying customized information for different passengers. Two fare gates 304 and 306 are illustrated in this figure. First fare gate 304 is an entry gate that allows passengers to enter (going up) the restricted area, which can be, for example, the boarding area of a public transit station, and second fare gate 306 is an exit gate for passengers to leave (going down) the restricted area. Each fare gate 304 and 306 also includes a ticket validation device (not labeled for clarity). Each arrow 308-322 illustrated in this figure represents a passenger walking on floor display 302, with the arrow indicating the direction that the passenger is walking in. Customized information is displayed in front of each passenger and the information follows the passenger as the passenger moves within floor display 302. Although floor display 302 is illustrated as only covering an area surrounding fare gates 304 and 306, it is understood that floor display 302 can be extended to any area, for example, using multiple tracking cameras and display devices.

Passenger 308 is approaching gate 304, and has not yet presented a ticket. Thus, general information regarding the status of the gate is displayed in front of passenger 308. In this embodiment, the displayed image or text indicates to passenger 308 that gate 304 is open in the direction that passenger 308 is walking in. Passenger 310 has presented a ticket to the ticket validation device at gate 304, but the ticket could not be validated. The image or text displayed to passenger 310 indicates that an invalid ticket has been presented, and the gate paddle did not open. In other embodiments, gate 304 can be a gate without paddles, such as an optical turnstile, and a message can be displayed to passenger 310 telling the passenger to revalidate at another validation device (e.g., on exit) or to purchase another ticket.

Passenger 312 has presented a valid ticket and has passed through gate 304. Based on the ticket that was presented, it is determined that passenger 312 will be departing from platform 3. The displayed message indicates the platform and also the estimated amount of time to reach the platform. In one embodiment, the estimated time can be based on general layout and distance to the platform. For example, the walking speed of passenger 312 can be determined based on tracking the position of passenger 312, and the time to reach platform 3 can be calculated based on walking speed and distance. In other embodiments, the estimated time can be further based on tracking previous passengers walking to platform 3 to account for delays caused by crowding or other temporary situations. Thus, a preset threshold can be used so that only recent tracking data (e.g., data that was generated within a time period that is less than or equal to the threshold) is taken into account when calculating the estimated time to the platform.

Passenger 314 has also presented a valid ticket and passed through gate 304. The image displayed in front of passenger 314 indicates directions to the platform or boarding area for the ticket that was presented. This image can be updated as passenger 314 moves around, so that directions to the platform from the current position of passenger 314 are always displayed. The displayed image also indicates the departure time for the ticket, which can be an absolute departure time (e.g., 3:05 p.m.) or, as in this case, a relative time to departure. In some embodiments, different information can be cycled through in the display such that each piece of information is displayed for a preset amount of time (e.g., 15 seconds). For example, after displaying the direction to platform and departure time to passenger 314 for 15 seconds, the platform number and the estimated amount of time to travel to the platform can be displayed for 15 seconds, and then an advertisement for a business can be displayed for 15 seconds. In some embodiments, the advertisement can be displayed based on the amount of time remaining till departure. For example, if the passenger has more than a preset amount of time remaining (e.g., 30 minutes), then an advertisement for a restaurant can be displayed. If the passenger has less than 30 minutes but more than 15 minutes, an advertisement for a bar or drink business can be displayed.

Passenger 316 is approaching gate 306 to exit the restricted area and has not yet presented a ticket to the ticket validation device for gate 306. Thus, general information is displayed to passenger 316 indicating that gate 306 is open for the direction that passenger 316 is walking in. In contrast, passenger 318 is approaching gate 306 is the wrong direction. Passenger 318 is trying to enter the area through gate 306 and gate 306 is an exit gate. Thus, a message is displayed to passenger 318 indicating that gate 306 is closed for the direction that passenger 318 is walking in.

Passenger 320 has presented a ticket to gate 306 and has passed through gate 306. Based on the ticket that was presented, it has been determined that passenger 320 has a connection segment of travel and should proceed to gate 6 for boarding. The displayed information also indicates that the departure for the connection segment has been delayed for 15 minutes. Passenger 322 has also presented a ticket and passed through gate 306. This is the final destination for passenger 322, thus an advertisement is displayed, which can also include a coupon or discount. In addition, local information, such as the weather and local time, is displayed to passenger 322.

Figure 4:
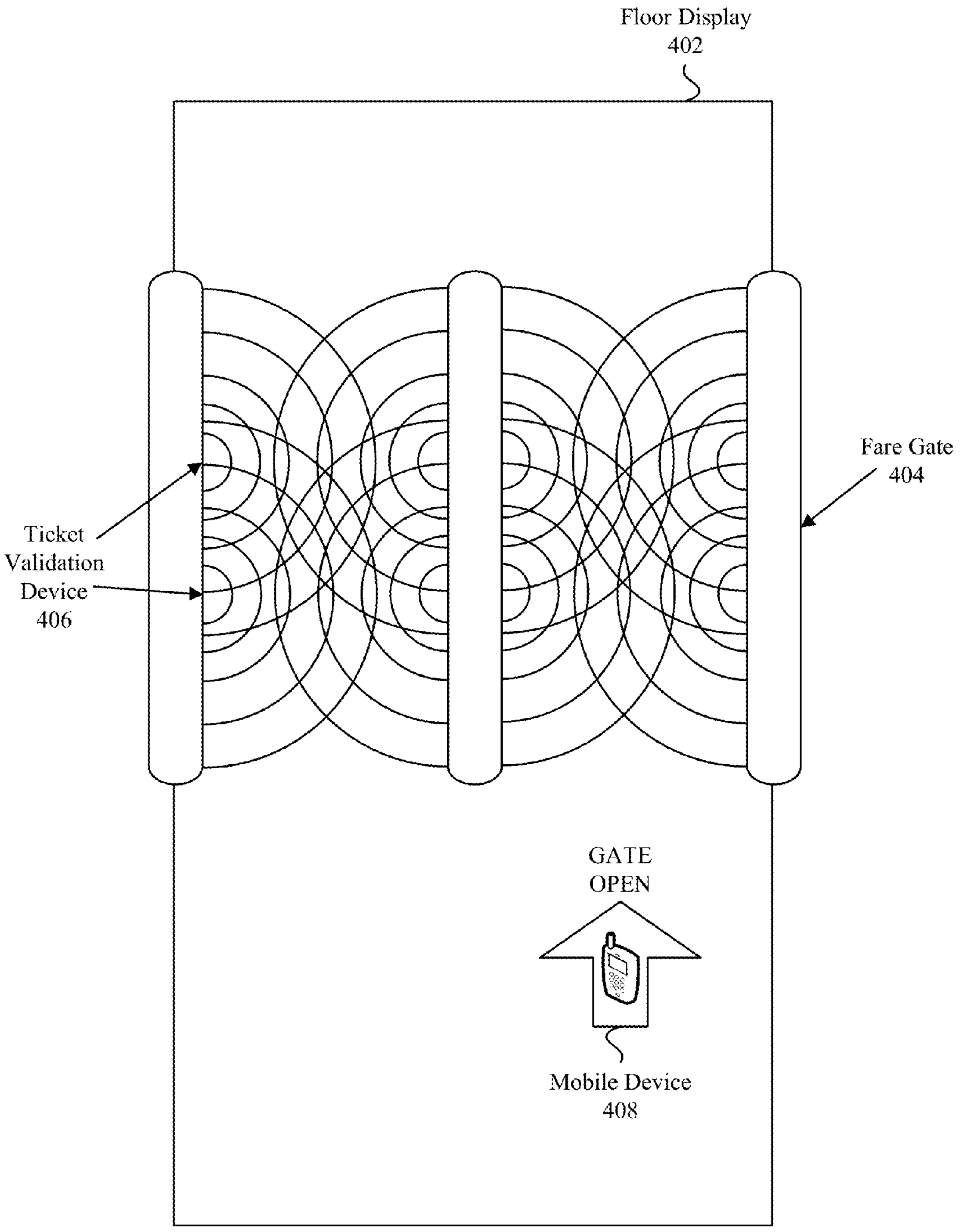
FIG. 4 is an illustration of an example environment for implementing an embodiment of a floor display for displaying information customized for a ticket of a fare gate.

FIG. 4 is an illustration of an example environment for implementing an embodiment of a floor display 402 for displaying information customized for a ticket of a fare gate 404. In this embodiment, fare gate 404 does not include a physical barrier. Furthermore, ticket validation device 406 is implemented as one or more wireless RF transceivers (not all labeled for clarity) that can receive ticket information from mobile devices, such as smart phones and tablets, for validation.

Mobile device 408 is approaching fare gate 404 and ticket information has not yet been received by ticket validation device 406. Thus, general gate status information is displayed to mobile device 408, or more specifically, the passenger carrying mobile device 408. As the passenger continues through gate 404 and mobile device 408 is within range for wireless communication with ticket validation device 406, ticket information can be received and customized information can be displayed based on the ticket information.

One advantage of gate 404, which does not have physical barriers, is that multiple passengers can go through gate 404 simultaneously or substantially simultaneously. To distinguish between different passengers and different mobile devices, techniques such as triangulation and trilateration can be used to determine the position of each mobile device passing through gate 404. Then, the position of each mobile device can be matched with the position of a passenger that is detected by the tracking system (not illustrated in this figure, see FIG. 2). In this way, the ticket information received from mobile device 408, and the custom image that is displayed based on the ticket information, can be associated with the respective passenger carrying mobile device 408 such that the image is displayed in front of the proper passenger, even when there are multiple passengers going through fare gate 404 simultaneously.

Figure 5:
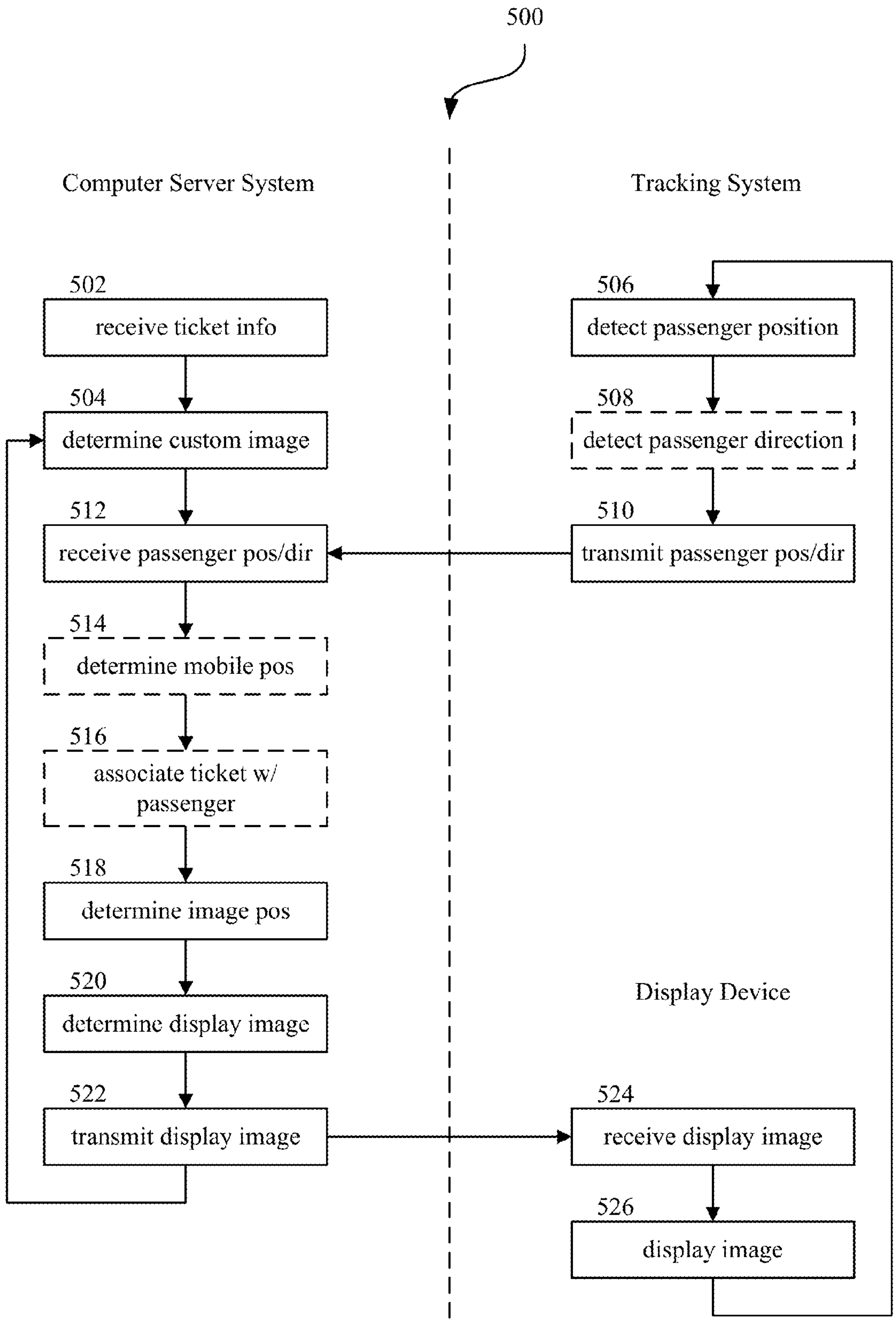
FIG. 5 is an interaction flowchart of one embodiment of a process for displaying information customized for a ticket of a fare gate.

FIG. 5 an interaction flowchart of one embodiment of a process 500 for displaying information customized for a ticket of a fare gate. This figure illustrates the interactions between a computer server system, a tracking system, and a display device. In this embodiment, process 500 starts at block 502, wherein the computer server system receives ticket information, for example, via a ticket validation device. Based on the ticket information, a custom image is determined at block 504. In some embodiments, more than one image can be determined, for example, as frames of a video.

At block 506, the tracking system detects the position of a passenger. In some embodiments, the tracking system detects the direction that the passenger is moving in at block 508. At block 510, data indicating the passenger position and direction of movement is transmitted to the computer server system and at block 512, the computer server system receives the data. If the ticket information is received from a mobile device, for example, as illustrated in FIG. 4, optional block 514 can be performed to determine the position of the mobile device. This can be done using techniques such as triangulation or trilateration, or the position of the mobile device can be detected using a global positioning system (GPS) of the mobile device and the mobile device can transmit the position to the computer server system. Optional block 516 can be performed to associate the ticket information, or the custom image determined based on the ticket, with the passenger by, for example, matching the position of the mobile device with the position of the passenger. In embodiments where the ticket information is not received from a mobile device, block 516 can be performed by determining that the position of the passenger is proximate to the ticket validation device when the ticket information is received, and the ticket can be associated with the passenger based on this determination.

At block 518, a position for displaying the custom image is determined based on the position of the passenger. For example, the position of the custom image can be displayed in the same position as the passenger, so that the passenger is standing on top of the image. In other embodiments, the position of the image is determined further based on the direction that the passenger is moving in, and the custom image is displayed in front of the passenger. At block 520, the computer server system determines a display image that includes the custom image at the position determined in block 518. The display image can also include other images for other passengers. Thus, the display image is the complete image that will be displayed by the display device. At block 522, the display image is transmitted to the display device and at block 524, the display device receives the display image. At block 526, the display image is displayed on the floor. Blocks 504-526 can be repeated to continuously update the display image such that each custom image follows the respective passenger and current information is always displayed to a passenger.

Figure 6:
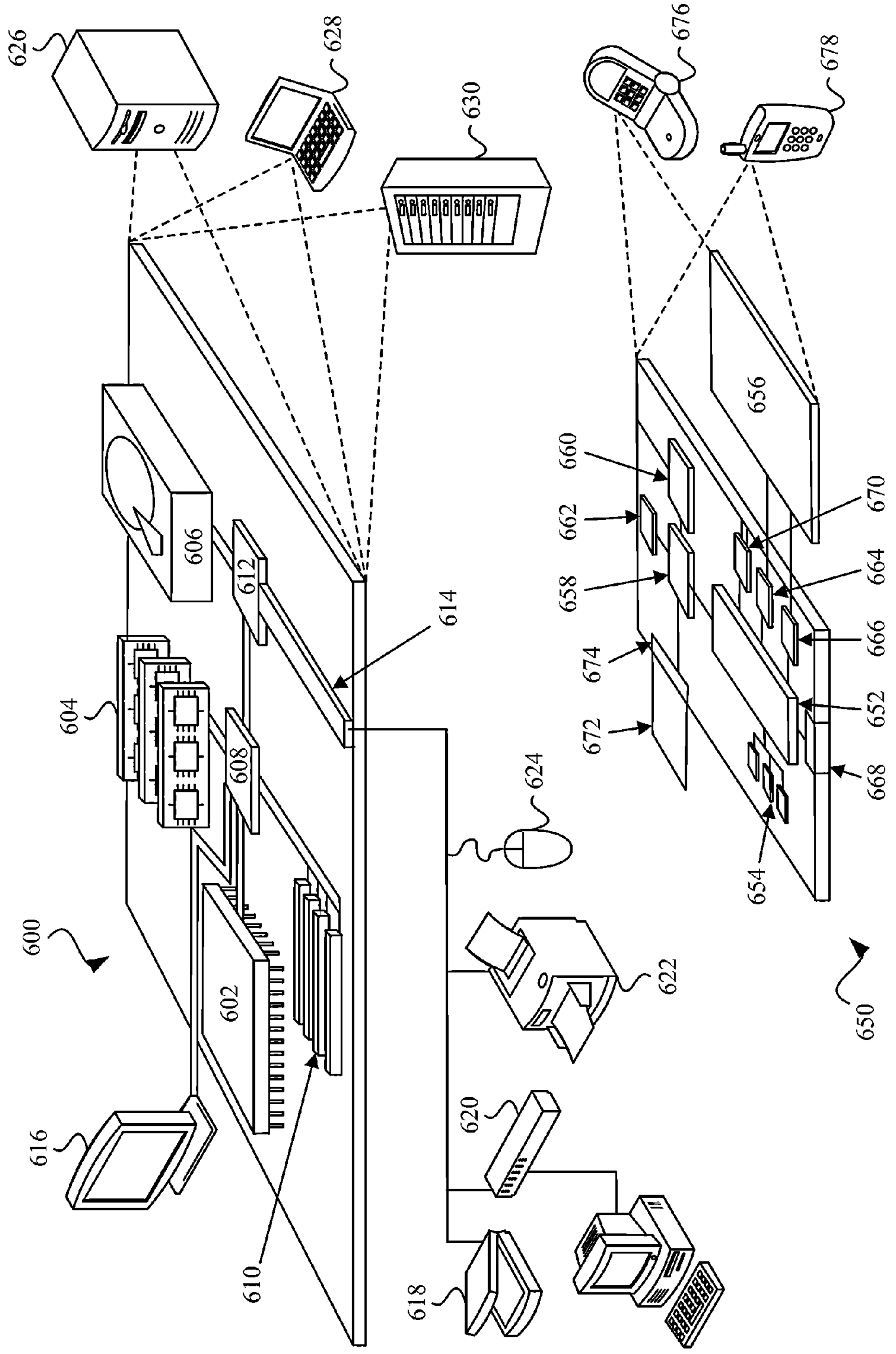
FIG. 6 is an illustration of embodiments of a special-purpose computer system and a computing device that can be used to implement a system for displaying information customized for a ticket of a fare gate.

FIG. 6 is an illustration of embodiments of a special-purpose computer system 600 and a computing device 650 that can be used to implement a system for displaying information customized for a ticket of a fare gate. Special-purpose computer system 600 represents various forms of digital computers, such as laptops, desktops, workstations, personal digital assistants, servers, blade servers, mainframes, and other appropriate computers. Computing device 650 represents various forms of mobile devices, such as personal digital assistants, cellular telephones, smart phones, tablets, laptops and other similar computing devices.

Computer system 600 includes a processor 602, random access memory (RAM) 604, a storage device 606, a high speed controller 608 connecting to RAM 604 and high speed expansion ports 610, and a low speed controller 612 connecting to storage device 606 and low speed expansion port 614. The components 602, 604, 606, 608, 610, 612, and 614 are interconnected using various busses, and may be mounted on a common motherboard or in other manners as appropriate. Computer system 600 can further include a number of peripheral devices, such as display 616 coupled to high speed controller 608. Additional peripheral devices can be coupled to low speed expansion port 614 and can include an optical scanner 618, a network interface 620 for networking with other computers, a printer 622, and input device 624 which can be, for example, a mouse, keyboard, track ball, or touch screen.

Processor 602 processes instructions for execution, including instructions stored in RAM 604 or on storage device 606. In other implementations, multiple processors and/or multiple busses may be used, as appropriate, along with multiple memories and types of memory. RAM 604 and storage device 606 are examples of non-transitory computer-readable media configured to store data such as a computer program product containing instructions that, when executed, cause processor 602 to perform methods and processes according to the embodiments described herein. RAM 604 and storage device 606 can be implemented as a floppy disk device, a hard disk device, an optical disk device, a tape device, a flash memory or other similar solid-state memory device, or an array of devices, including devices in a storage area network or other configurations.

High speed controller 608 manages bandwidth-intensive operations for computer system 600, while low speed controller 612 manages lower bandwidth-intensive operations. Such allocation of duties is exemplary only. In one embodiment, high speed controller 608 is coupled to memory 604, display 616 (e.g., through a graphics processor or accelerator), and to high speed expansion ports 610, which can accept various expansion cards (not shown). In the embodiment, low speed controller 612 is coupled to storage device 606 and low speed expansion port 614. Low speed expansion port 614 can include various communication ports or network interfaces, such as universal serial bus (USB), Bluetooth, Ethernet, and wireless Ethernet.

Computer system 600 can be implemented in a number of different forms. For example, it can be implemented as a standard server 626, or multiple servers in a cluster. It can also be implemented as a personal computer 628 or as part of a rack server system 630. Alternatively, components from computer system 600 can be combined with other components in a mobile device (not shown), such as device 650. Each of such devices can contain one or more of computer system 600 or computing device 650, and an entire system can be made up of multiple computer systems 600 and computing devices 650 communicating with each other.

Computing device 650 includes a processor 652, memory 654, an input/output device such as a display 656, a communication interface 658, and a transceiver 660, among other components. The components 652, 654, 656, 658, and 660 are interconnected using various busses, and several of the components may be mounted on a common motherboard or in other manners as appropriate. Computing device 650 can also include one or more sensors, such as GPS or A-GPS receiver module 662, cameras (not shown), and inertial sensors including accelerometers (not shown), gyroscopes (not shown), and/or magnetometers (not shown) configured to detect or sense motion or position of computing device 650.

Processor 652 can communicate with a user through control interface 664 and display interface 666 coupled to display 656. Display 656 can be, for example, a thin-film transistor (TFT) liquid-crystal display (LCD), an organic light-emitting diode (OLED) display, or other appropriate display technology. Display interface 666 can comprise appropriate circuitry for driving display 656 to present graphical and other information to the user. Control interface 664 can receive commands from the user and convert the commands for submission to processor 652. In addition, an external interface 668 can be in communication with processor 652 to provide near area communication with other devices. External interface 668 can be, for example, a wired communication interface, such as a dock or USB, or a wireless communication interface, such as Bluetooth or near field communication (NFC).

Device 650 can also communicate audibly with the user through audio codec 670, which can receive spoken information and convert it to digital data that can be processed by processor 652. Audio codec 670 can likewise generate audible sound for the user, such as through a speaker. Such sound can include sound from voice telephone calls, recorded sound (e.g., voice messages, music files, etc.), and sound generated by applications operating on device 650.

Expansion memory 672 can be connected to device 650 through expansion interface 674. Expansion memory 672 can provide extra storage space for device 650, which can be used to store applications or other information for device 650. Specifically, expansion memory 672 can include instructions to carry out or supplement the processes described herein. Expansion memory 672 can also be used to store secure information.

Computing device 650 can be implemented in a number of different forms. For example, it can be implemented as a cellular telephone 676, smart phone 678, personal digital assistant, tablet, laptop, or other similar mobile device.

It is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term “memory” refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for displaying information customized for a ticket of a fare gate, the system comprising:

a ticket validation device configured to receive ticket information from the ticket that is presented to the ticket validation device;

a display device configured to display visual information on an area of a floor, wherein the display device comprises a lenticular lens configured to display a first image when viewed from a first side of the fare gate, and a second image when viewed from a second side of the fare gate opposite from the first side, wherein the first image indicates a first gate status for passage through the fare gate in a first direction, and wherein the second image indicates a second gate status for passage through the fare gate in a second direction opposite from the first direction;

a tracking system configured to detect an object within the area and track a first position and a different second position of the object within the area; and a computer server system coupled to the ticket validation device, the display device and the tracking system, the computer server system being configured to:

receive ticket data from the ticket validation device, the ticket data indicating the ticket information of the ticket, determine a customized image for the ticket based on the ticket data, receive position data from the tracking system, the position data indicating the first position of the object within the area, determine, based on the first position of the object, a third position within the area for displaying the customized image, wherein the third position is proximate to the first position, determine a display image for the area, the display image including the customized image at the third position, transmit a first signal to the display device that causes the display image to be displayed within the area on the floor, receive updated position information from the tracking system, the updated position data indicating the different second position of the object within the area, determine, based on the second position of the object, a fourth position within the area for displaying the customized image, wherein the fourth position is proximate to the second position, and transmit a second signal to the display device that causes the display image to be displayed within the area on the floor at the fourth position such that movement of the display image corresponds with movement of the object.

2. The system of claim 1, wherein the tracking system includes an overhead depth camera.

3. The system of claim 1, wherein the tracking system includes a pressure sensitive walkway.

4. The system of claim 1, wherein the customized image indicates a platform of departure for the ticket.

5. The system of claim 1, wherein the customized image indicates a direction to a boarding area for the ticket.

6. The system of claim 1, wherein:

the first image is only viewable from a first user looking at the area of the floor from a first position between about 0 to 90 degrees relative to the fare gate and the second image is only viewable from a second user looking at the area of the display from a second position between about 90 to 180 degrees relative to the fare gate.

7. A method for displaying information customized for a ticket of a fare gate, the method comprising:

displaying, using a lenticular lens, a first image when viewed from a first side of the fare gate and a second image when viewed from a second side of the fare gate opposite from the first side, wherein the first image indicates a first gate status for passage through the fare gate in a first direction, and wherein the second image indicates a second gate status for passage through the fare gate in a second direction opposite from the first direction;

receiving ticket information for the ticket via a ticket validation device;

determining a customized image for the ticket based on the ticket information;

detecting a first position of an object within an area of a floor;

determining, based on the first position of the object, a second position within the area for displaying the customized image, wherein the second position is proximate to the first position;

determining a display image for the area, the display image including the customized image at the second position;

displaying the display image within the area on the floor;

detecting a third position of the object within the area, the third position being different than the first position, determining, based on the third position of the object, a fourth position within the area for displaying the customized image, wherein the fourth position is proximate to the second position, and displaying the display image within the area on the floor at the fourth position such that movement of the display image corresponds with movement of the object.

8. The method of claim 7, further comprising:

determining that the first position of the object is proximate to the ticket validation device; and associating the ticket information with the object based on determining that the first position of the object is proximate to the ticket validation device.

9. The method of claim 7, further comprising:

determining a direction of movement of the object; and displaying the customized image in front of the object relative to the direction of movement.

10. The method of claim 7, wherein the customized image indicates a discount applied to a fare of the ticket.

11. The method of claim 7, wherein determining the customized image to display further comprises selecting one of connection information and local information to display based on the ticket information, wherein the connection information is associated with a connecting segment of travel for a trip of the ticket, and wherein the local information is associated with a destination of the trip.

12. The method of claim 11, wherein the location information includes an advertisement for a business located at a destination station.

13. The method of claim 7, wherein:

the first image is only viewable from a first user looking at the area of the floor from a first position between about 0 to 90 degrees relative to the fare gate and the second image is only viewable from a second user looking at the area of the display from a second position between about 90 to 180 degrees relative to the fare gate.

14. A non-transitory computer-readable medium, having instructions stored therein, which when executed cause a computer to perform a set of operations comprising:

displaying, using a lenticular lens, a first image when viewed from a first side of the fare gate and a second image when viewed from a second side of the fare gate opposite from the first side, wherein the first image indicates a first gate status for passage through the fare gate in a first direction, and wherein the second image indicates a second gate status for passage through the fare gate in a second direction opposite from the first direction;

receiving ticket data from a ticket validation device, the ticket data indicating ticket information for a ticket of a fare gate;

determining a customized image for the ticket based on the ticket data;

receiving position data from a tracking system, the position data indicating a first position of an object within an area of a floor;

determining, based on the first position of the object, a second position within the area for displaying the customized image, wherein the second position is proximate to the first position;

determining a display image for the area, the display image including the customized image at the second position;

transmitting a first signal to a display device that causes the display device to display the display image within the area on the floor;

receiving updated position information from the tracking system, the updated position data indicating a different third position of the object within the area, determining, based on the third position of the object, a fourth position within the area for displaying the customized image, wherein the fourth position is proximate to the third position, and transmitting a second signal to the display device that causes the display image to be displayed within the area on the floor at the fourth position such that movement of the display image corresponds with movement of the object.

15. The non-transitory computer-readable medium of claim 14, wherein the customized image indicates a departure time of the ticket.

16. The non-transitory computer-readable medium of claim 14, wherein the customized image indicates delay information for a departure associated with the ticket.

17. The non-transitory computer-readable medium of claim 14, wherein the customized image indicates whether the ticket was successfully validated.

18. The non-transitory computer-readable medium of claim 14, wherein the customized image indicates an estimated travel time to a boarding area for the ticket from the first position of the object.

19. The non-transitory computer-readable medium of claim 18, having further instructions stored therein, which when executed cause the computer to perform a set of operations comprising:

receiving tracking data from the tracking system, the tracking data indicating a tracked position of a second object as the second object moves within the area of the floor; and calculating the estimated travel time based on the tracking data.

20. The non-transitory computer-readable medium of claim 14, wherein:

the first image is only viewable from a first user looking at the area of the floor from a first position between about 0 to 90 degrees relative to the fare gate and the second image is only viewable from a second user looking at the area of the display from a second position between about 90 to 180 degrees relative to the fare gate.

* * * * *